US011413819B2

(12) United States Patent
Jou et al.

(10) Patent No.: US 11,413,819 B2
(45) Date of Patent: Aug. 16, 2022

(54) MULTI-MATERIAL MEMBRANE FOR VAT POLYMERIZATION PRINTER

(71) Applicant: NEXA3D INC., Ventura, CA (US)

(72) Inventors: Jeng-dung Jou, Irvine, CA (US); Izhar Medalsy, Ventura, CA (US)

(73) Assignee: NEXA3D INC., Ventura, CA (US)

( * ) Notice: Subject to any disclaimer, the term of this patent is extended or adjusted under 35 U.S.C. 154(b) by 146 days.

(21) Appl. No.: 16/948,118

(22) Filed: Sep. 3, 2020

(65) Prior Publication Data

US 2022/0063193 A1 Mar. 3, 2022

(51) Int. Cl.
| | |
|---|---|
| *B29C 64/255* | (2017.01) |
| *B32B 25/08* | (2006.01) |
| *B33Y 30/00* | (2015.01) |
| *B32B 25/20* | (2006.01) |
| *B32B 27/32* | (2006.01) |

(52) U.S. Cl.
CPC ............ *B29C 64/255* (2017.08); *B32B 25/08* (2013.01); *B32B 25/20* (2013.01); *B32B 27/32* (2013.01); *B33Y 30/00* (2014.12); *B32B 2255/10* (2013.01); *B32B 2255/26* (2013.01)

(58) Field of Classification Search
CPC ....... B29C 64/255; B33Y 30/00; B32B 25/08; B32B 25/20; B32B 27/32
See application file for complete search history.

(56) References Cited

U.S. PATENT DOCUMENTS

| | | | |
|---|---|---|---|
| 4,575,330 A | 3/1986 | Hull | |
| 5,122,441 A | 6/1992 | Lawton et al. | |
| 5,391,072 A | 2/1995 | Lawton et al. | |
| 5,476,749 A | 12/1995 | Steinmann et al. | |
| 5,744,241 A * | 4/1998 | Hobson | B29C 33/68 264/214 |
| 8,663,539 B1 | 3/2014 | Kolodziejska et al. | |
| D734,788 S | 7/2015 | Reches et al. | |
| D777,251 S | 1/2017 | Stand | |
| 10,844,211 B2 | 11/2020 | Lee et al. | |

(Continued)

FOREIGN PATENT DOCUMENTS

| | | |
|---|---|---|
| EP | 171069 A2 | 2/1986 |
| EP | 184086 A1 | 5/1992 |

(Continued)

OTHER PUBLICATIONS

Zhang; et al., "Fluoroethylenepropylene ferroelectret films with cross-tunnel structure for piezoelectric transducers and micro energy harvesters", Journal of Applied Physics (2014), 116(074109):1-8.

(Continued)

*Primary Examiner* — Joseph S Del Sole
*Assistant Examiner* — John Robitaille
(74) *Attorney, Agent, or Firm* — Ascenda Law Group, PC (57) ABSTRACT

Multi-material membranes for use in vat polymerization printers. The membranes include a fluorinated ethylene propylene (FEP) or polyolefin polymer film bonded to a layer of silicone rubber. The layer of silicone rubber is coated to reduce its surface energy. Coatings such as a silicone elastomer or polytetrafluoroethylene (PTFE)-based material may be used. The coatings are preferably sprayed on and allowed to cure or dry after the FEP or other film has been bonded to the layer of silicone rubber.

18 Claims, 8 Drawing Sheets

(56) References Cited

U.S. PATENT DOCUMENTS

| | | |
|---|---|---|
| 2002/0153640 A1 | 10/2002 | John |
| 2009/0002669 A1 | 1/2009 | Liu |
| 2012/0195994 A1 | 8/2012 | El-Siblani et al. |
| 2013/0241113 A1 | 9/2013 | Geers et al. |
| 2014/0191442 A1 | 7/2014 | Elsey |
| 2015/0027853 A1 | 1/2015 | Findley et al. |
| 2015/0064298 A1 | 3/2015 | Syao |
| 2015/0072293 A1 | 3/2015 | Desimone et al. |
| 2015/0145171 A1 | 5/2015 | Walker et al. |
| 2015/0152270 A1 | 6/2015 | Aizenberg et al. |
| 2015/0352788 A1 | 12/2015 | Livingston et al. |
| 2016/0046072 A1 | 2/2016 | Rolland et al. |
| 2016/0046075 A1 | 2/2016 | Desimone et al. |
| 2016/0046080 A1 | 2/2016 | Thomas et al. |
| 2016/0052205 A1 | 2/2016 | Frantzdale |
| 2016/0082655 A1 | 3/2016 | Castanon et al. |
| 2016/0129645 A1 | 5/2016 | Wighton et al. |
| 2016/0136890 A1 | 5/2016 | Castanon et al. |
| 2016/0193786 A1 | 7/2016 | Moore et al. |
| 2016/0200052 A1 | 7/2016 | Moore et al. |
| 2016/0229123 A1 | 8/2016 | Carlson et al. |
| 2016/0263837 A1 | 9/2016 | Goldman et al. |
| 2016/0288376 A1 | 10/2016 | Sun et al. |
| 2016/0303793 A1 | 10/2016 | Ermoshkin et al. |
| 2016/0311158 A1 | 10/2016 | Desimone et al. |
| 2016/0325493 A1 | 11/2016 | Desimone et al. |
| 2016/0332386 A1 | 11/2016 | Kuijpers |
| 2016/0369096 A1 | 12/2016 | Rolland et al. |
| 2017/0129167 A1 | 5/2017 | Castanon |
| 2017/0129175 A1 | 5/2017 | Zitelli et al. |
| 2018/0036941 A1 | 2/2018 | Xu et al. |
| 2018/0207867 A1 | 7/2018 | Medalsy et al. |
| 2020/0055251 A1 | 2/2020 | Medalsy |

FOREIGN PATENT DOCUMENTS

| | | |
|---|---|---|
| EP | 506616 A1 | 9/1992 |
| EP | 2074188 A1 | 7/2009 |
| EP | 2226683 A1 | 9/2010 |
| EP | 3023226 A1 | 5/2016 |
| ES | 2588485 T3 | 11/2016 |
| HK | 1215475 A1 | 8/2016 |
| KR | 102141650 B1 | 8/2020 |
| WO | 2012021940 A1 | 2/2012 |
| WO | 2015107066 A1 | 7/2015 |
| WO | 2016010946 A1 | 1/2016 |
| WO | 2016081410 A1 | 5/2016 |
| WO | 2016109550 A1 | 7/2016 |
| WO | 2016123499 A1 | 8/2016 |
| WO | 2016123506 A1 | 8/2016 |
| WO | 2016126796 A2 | 8/2016 |
| WO | 2016133759 A1 | 8/2016 |
| WO | 2016140886 A1 | 9/2016 |
| WO | 2016140888 A1 | 9/2016 |
| WO | 2016140891 A1 | 9/2016 |
| WO | 2016145050 A1 | 9/2016 |
| WO | 2016145182 A1 | 9/2016 |
| WO | 2016149097 A1 | 9/2016 |
| WO | 2016149104 A1 | 9/2016 |
| WO | 2016149151 A1 | 9/2016 |
| WO | 2016126796 A3 | 10/2016 |
| WO | 2016172784 A1 | 11/2016 |
| WO | 2016172788 A1 | 11/2016 |
| WO | 2016172804 A1 | 11/2016 |
| WO | 2016172805 A1 | 11/2016 |
| WO | 2017056124 A1 | 4/2017 |

OTHER PUBLICATIONS

International Search Report and Written Opinion dated Dec. 20, 2021, from ISA/European Patent Office, for International Patent Application No. PCT/US2021/047014 (filed Aug. 20, 2021), 14 pgs.

Henry, Dr. William, "MicroLED Arrays Find Applications in the Very Small", Photonics Spectra (Mar. 2013), downloaded from: https://www.photonics.com/a53224/MicroLED_Arrays_Find_Applications_in_the_Very, 7 pages.

International Search Report and Written Opinion dated Feb. 6, 2017, from the European Patent Office, for International Patent Application No. PCT/IT2016/000225 (filed Oct. 3, 2016), 9 pgs.

International Search Report and Written Opinion dated May 4, 2018, from the ISA: European Patent Office, for International Patent Application No. PCT/US2018/015285 (filed Jan. 25, 2018), 13 pgs.

International Preliminary Report on Patentability dated Aug. 8, 2019, from the International Bureau of WIPO, for International Patent Application No. PCT/US2018/015285 (filed Jan. 25, 2018), 8 pages.

International Preliminary Report on Patentability dated Aug. 8, 2019, from the International Bureau of WIPO, for International Patent Application No. PCT/US2018/012774 (filed Jan. 8, 2018), 7 pages.

International Search Report and Written Opinion dated May 24, 2018, from ISA—European Patent Office, for International Application No. PCT/US2018/012774 (filed Jan. 8, 2018), 13 pages.

Krayden, Inc., "Food-Grade Mold Release", MicroCare (2007), 1 pg.

Vu; et al., "LED Uniform Illumination Using Double Linear Fresnel Lenses for Energy Saving", Energies (2017), 10 (2091):1-15.

* cited by examiner

MULTI-MATERIAL MEMBRANE FOR VAT POLYMERIZATION PRINTER

FIELD OF THE INVENTION

The present invention relates to additive manufacturing processes and, in particular, to a multi-material membrane used in vat polymerization printers.

BACKGROUND

Additive manufacturing, or 3D printing as it is known, is a collection of different technologies that provide different means of direct production of various articles. One such technology is vat polymerization, which involves the selective curing of viscous resins contained in a vat using (typically) ultraviolet (UV) light sources. The resin is cured layer by layer so that the article under manufacture is created through a successive series of cross-sections that adhere to one another.

One issue of importance in vat polymerization printing is the makeup of the vat (or tank) in which the liquid polymer from which a printed three-dimensional object is obtained by photo-curing is collected. In order to avoid tearing newly-formed layers of polymer from other portions of the three-dimensional object under construction when an extraction plate is raised, the vat must permit detachment of that just-formed layer from its surface (typically, a transparent base that allows the passage of ultra-violet (UV) light for triggering the photo-curing process, e.g., quartz or borosilicate glass). Often, a non-stick coating is applied to the inside surface of the vat to allow the first layer of cured polymer to adhere to the extraction plate and successive layers to join together in sequence.

However, in conventional vat polymerization printers there exists a suction effect, which occurs between the surface of the object under construction and the non-stick material which covers the transparent base of the vat, and which imposes limiting effects on the speed with which the object can be printed. In effect, a newly-formed polymer layer remains immersed in the resin at a distance "s" (equal to the thickness of the next layer of the object being formed) from the non-stick surface of the vat (both surfaces being coplanar and flat to give precision to the layer which will be formed); and a new layer of the object is generated by photo-curing the resin within that space. The absence of air creates a vacuum between the two surfaces, which are surrounded by a highly viscous liquid, and when the newly formed layer is displaced away from the vat surface (to make room for yet a further layer of the object to be formed), mechanical stresses suffered by that new layer (which may be only a few tenths of a millimetre thick) may be significant. Thus, there is an attendant risk of tearing the newly formed layer if the previous layer to which it is adhered is displaced vertically away from the bottom surface of the vat in a rapid fashion.

In order to reduce this risk of tearing, conventional printing processes were performed in such a way that the extraction plate (and the objects adhered thereto) were raised slowly. This limited the speed of production of three-dimensional objects by vat polymerization to be on the order of hours per centimetre. Accordingly, techniques were developed to alleviate the mechanical stresses on newly formed polymer layers produced by such processes. One such technique was the introduction of flexible membranes between the bottom surface of the vat and the article undergoing fabrication. U.S. PGPUB 2018/0207867, filed Mar. 19, 2018, and assigned to the assignee of the present invention describes one such flexible membrane made of a clear, self-lubricating polymer. Other membrane-based approaches have also been employed. For example, Elsey, U.S. PGPUB 2014/0191442 describes a membrane with an anti-stick surface made from a fluorinated ethylene propylene (FEP) fluoropolymer film. While flexible, such a film is not particularly elastic. Other materials contemplated by Elsey include nylon and mylar, or a laminated membrane having a layer of silicone bonded to a polyester film, with the silicone being the resin-facing side of the membrane and the polyester backing providing some elasticity.

While FEP fluoropolymer membranes do offer good anti-stick properties, they are relatively rigid and, therefore, do not afford much improvement of printing speeds over anti-stick coatings applied directly to vat surfaces. Furthermore, their rigidity can lead to the membrane being damaged during its installation in a vat polymerization printer. Silicone rubber membranes can provide improved flexibility over FEP fluoropolymer membranes, and thereby permit faster overall printing speeds, however, they suffer from susceptibility to wear and tear as they tend to degrade when exposed to high temperatures such as those produced due to the exothermic nature of the polymerization reaction within a printer's vat. They are also porous mediums and may offer little or no resistance to constituent components of some 3D printing resins.

BRIEF DESCRIPTION OF THE DRAWINGS

The present invention is illustrated by way of example, and not limitation, in the figures of the accompanying drawings, in which.

DETAILED DESCRIPTION

Disclosed herein are examples of multi-material membranes for use in vat polymerization printers.

Figure 1:
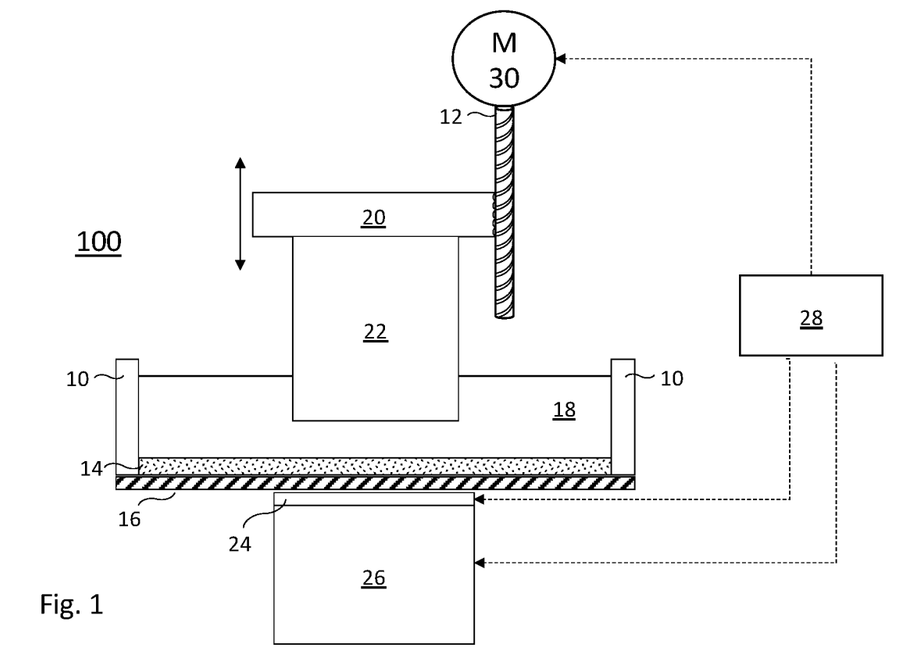
FIG. 1 depicts a schematic cross-section of a 3D printing system for fabricating an object in a tank containing a photo-curing liquid resin having a multi-material membrane in accordance with an embodiment of the present invention.

FIG. 1 depicts a cross-section of 3D printing system 100 configured with a multi-material membrane in accordance with an embodiment of the present invention, in which electromagnetic radiation (e.g., UV light) is used to cure a photo-curing liquid resin (typically a liquid polymer) 18 in order to fabricate an object (e.g., a 3D object) 22. Object 22 is fabricated layer by layer (i.e., a new layer of object 22 is be formed by photo-curing a layer of liquid polymer 18 adjacent to the bottom surface of object 22), and as each new layer is formed the object may be raised by build plate 20, allowing a next layer of photo-curing liquid resin 18 to be drawn under the newly formed layer. This process may be repeated multiple times to form additional layers until fabrication of the object is complete.

The 3D printing system 100 includes tank (or vat) 10 for containing the photo-curing liquid resin 18. The bottom of tank 10 (or at least a portion thereof) is sealed (i.e., to prevent the photo-curing liquid polymer 18 from leaking out of tank 10) by a flexible, multi-material membrane 14, which is transparent (or nearly so) at wavelengths of interest for curing of the resin to allow electromagnetic radiation from a light source 26 to enter into tank 10. A mask 24 (e.g., a liquid crystal layer) is disposed between light source 26 and the photo-curing liquid resin 18 to allow the selective curing of the liquid resin (which allows the formation of 3D objects into desired shapes/patterns). In various embodiments, collimation and diffusion elements such as lenses, reflectors, filters, and/or films may be positioned between mask 24 and light source 26. These elements are not shown in the illustrations so as not to unnecessarily obscure the drawing.

A platen or backing member 16 formed of borosilicate glass or other material is disposed between the mask 24 and the flexible, multi-material membrane 14 and provides structural support. The platen is also transparent (or nearly so) at the one or more wavelengths of interest for curing the resin. In other instances, platen 16 may be metal or plastic and include a transparent window to allow electromagnetic radiation from light source 26 to enter into tank 10. In other embodiments, the mask 24 itself may be used in place of a separate window and its perimeter sealed with a gasket. Note that although the mask 24, platen 16, and membrane 14 are shown as being displaced from one another by some distance, in practice these components may be positioned so as to touch one another, so as to prevent refraction at any air interfaces. Flexible, multi-material membrane 14 is secured to the edges of tank 10 or to a replaceable cartridge assembly (not shown) so as to maintain a liquid-tight perimeter at the edges of the tank or other opening ("liquid-tight" meaning that the tank does not leak during normal use).

When fabricating a layer of object 22 using 3D printing system 100, electromagnetic radiation is emitted from radiation source 26 through mask 24, platen 16, and membrane 14 into tank 10. The electromagnetic radiation forms an image on an image plane adjacent the bottom of object 22. Areas of high (or moderate) intensity within the image cause curing of localized regions of the photo-curing liquid resin 18. The newly cured layer adheres to the former bottom surface of object 22 and substantially does not adhere to the bottom surface of tank 10 due to the presence of flexible, multi-material membrane 14. After the newly cured layer has been formed, the emission of electromagnetic radiation may temporarily be suspended (or not, in the case of "continuous printing") while the build plate 20 is raised away from the bottom of the tank so that another new layer of object 22 may be printed.

The build plate 20 may be raised and lowered by the action of a motor (M) 30, which drives a lead screw 12 or other arrangement. Rotation of the lead screw 12 due to rotation of the motor shaft causes the build plate 20 to be raised or lowered with respect to the bottom of the tank 10. In other embodiments, a linear actuator or other arrangement may be used to raise and lower the build plate 20.

Figure 2:
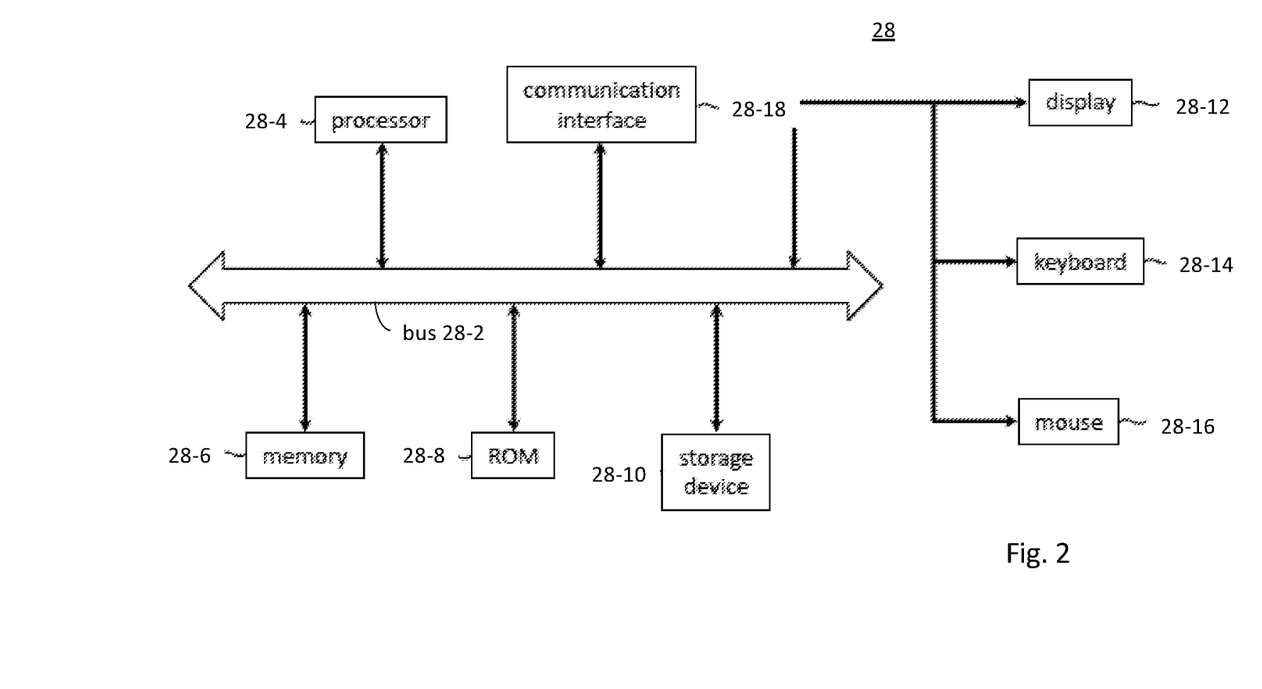
FIG. 2 depicts an example of a controller for the 3D printing system illustrated in FIG. 1.

Aspects of the printing process are directed by a controller 28, which may be implemented as a processor-based system with a processor-readable storage medium having processor-executable instructions stored thereon so that when the processor executes those instructions it performs operations to cause the actions described above. For example, among other things controller 28 may instruct raising/lowering of the build plate 20 via motor 30, activation and deactivation of the light source 26, and the projection of cross-sectional images of the object under fabrication via mask 24. FIG. 2 provides an example of such a controller 28, but not all such controllers need have all of the features of controller 28. For example, certain controllers may not include a display inasmuch as the display function may be provided by a client computer communicatively coupled to the controller or a display function may be unnecessary. Such details are not critical to the present invention.

Controller 28 includes a bus 28-2 or other communication mechanism for communicating information, and a processor 28-4 (e.g., a microprocessor) coupled with the bus 28-2 for processing information. Controller 28 also includes a main memory 28-6, such as a random access memory (RAM) or other dynamic storage device, coupled to the bus 28-2 for storing information and instructions (e.g., g-code) to be executed by processor 28-4. Main memory 28-6 also may be used for storing temporary variables or other intermediate information during execution of instructions to be executed by processor 28-4. Controller 28 further includes a read only memory (ROM) 28-8 or other static storage device coupled to the bus 28-2 for storing static information and instructions for the processor 28-4. A storage device 28-10, for example a hard disk, flash memory-based storage medium, or other storage medium from which processor 28-4 can read, is provided and coupled to the bus 28-2 for storing information and instructions (e.g., operating systems, applications programs such as a slicer application, and the like).

Controller 28 may be coupled via the bus 28-2 to a display 28-12, such as a flat panel display, for displaying information to a computer user. An input device 28-14, such as a keyboard including alphanumeric and other keys, may be coupled to the bus 28-2 for communicating information and command selections to the processor 28-4. Another type of user input device is cursor control device 28-16, such as a mouse, a trackpad, or similar input device for communicating direction information and command selections to processor 28-4 and for controlling cursor movement on the display 28-12. Other user interface devices, such as microphones, speakers, etc. are not shown in detail but may be involved with the receipt of user input and/or presentation of output.

Controller 28 also includes a communication interface 28-18 coupled to the bus 28-2. Communication interface 28-18 may provide a two-way data communication channel with a computer network, which provides connectivity to and among the various computer systems discussed above. For example, communication interface 28-18 may be a local area network (LAN) card to provide a data communication connection to a compatible LAN, which itself is communicatively coupled to the Internet through one or more Internet service provider networks. The precise details of such communication paths are not critical to the present invention. What is important is that controller 28 can send and receive messages and data, e.g., a digital file representing 3D articles to be produced using printer 100 through the communication interface 28-18 and in that way communicate with hosts accessible via the Internet. It is noted that the components of controller 28 may be located in a single device or located in a plurality of physically and/or geographically distributed devices.

Figure 3:
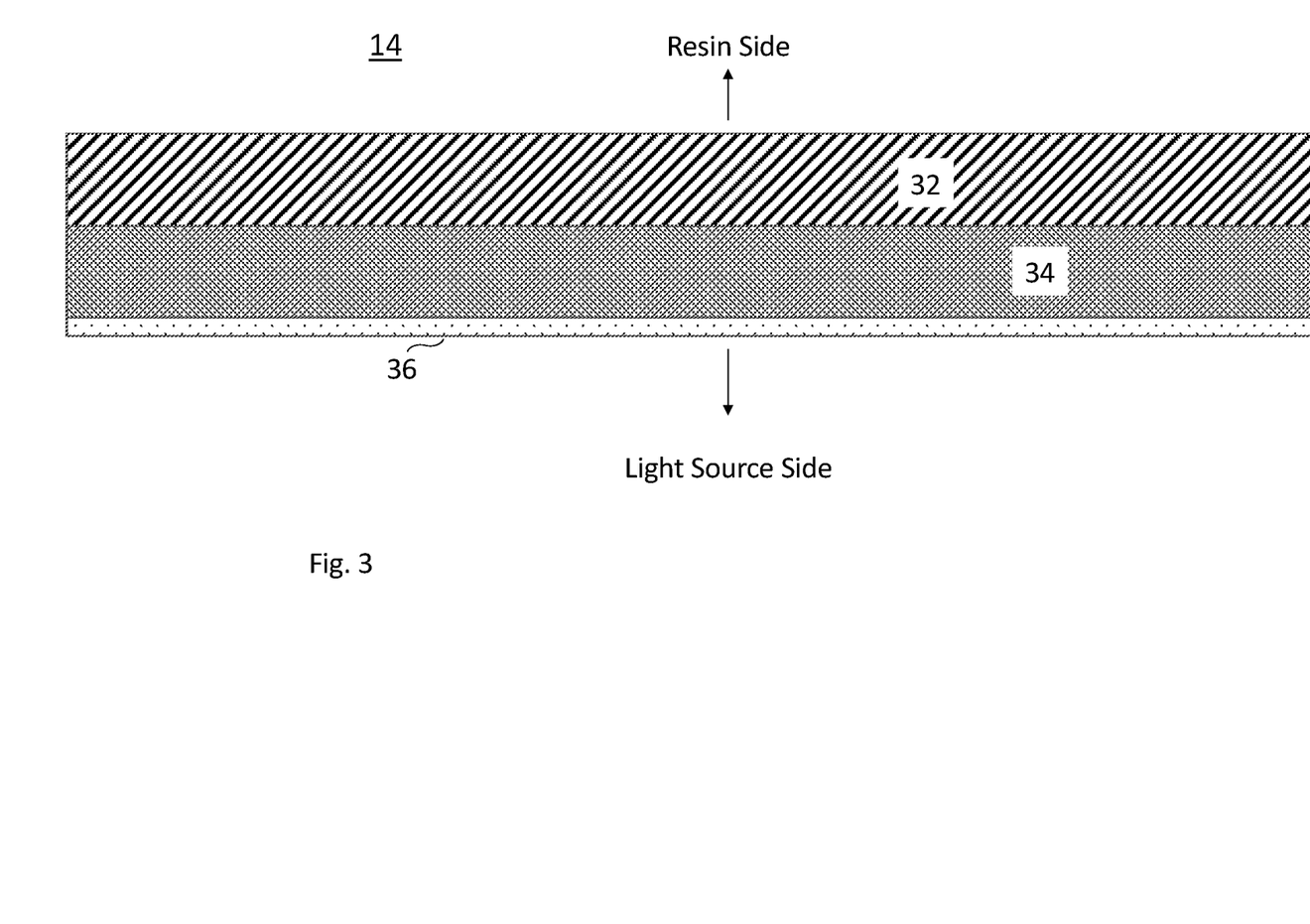
FIG. 3 is a cross-sectional view of a multi-material membrane for use with a3D printing system such as that shown in FIG. 1 in accordance with an embodiment of the present invention.

FIG. 3 is a cross-sectional view of multi-material membrane 14. The multi-material membrane 14 is made up of a fluorinated ethylene propylene (FEP) or polyolefin polymer film 32 bonded to a layer of silicone rubber 34, with the FEP film 32 on the resin-facing side of the membrane and the layer of silicone rubber 34 on the vat-facing or light source facing side of the membrane. The layer of silicone rubber 34 is coated 36 to reduce its surface energy and coefficient of friction. In various embodiments, each of the FEP film 32 and layer of silicone rubber 34 may have a respective thickness of approximately 0.03 mm to 0.1 mm. The multi-material makeup of membrane 14 provides both anti-stick properties (i.e., meaning that the membrane will allow for rapid printing by allowing newly formed polymer layers to separate from the FEP film with minimal tearing) as well as high heat resistance, chemical resistance, strength and flexibility.

The coating 36 applied to the silicone rubber layer 34 provides increased durability over untreated silicone rubber membranes used for 3D printing applications. Various coatings 36 may be used, for example chemical coatings such as silicone elastomers (e.g., silane acetates, silane ethyl acetates, silane triacetates, silane ethyl triacetates, silane methyl triacetates, octamethyltrisiloxane, methylhydosiloxane, siloxanes, and mixtures of two or more the foregoing, etc., with or without catalysts such as dibutyltindilaurate) dispersed in media such as xylene, tert-Butyl acetate, or similar solvents. These coatings are applied uniformly over the silicone rubber layer 34 and are allowed to cure, either at elevated temperature, e.g., 80-150° C., or at room temperatures, for approximately 5 minutes to 24 hours (depending on the relative humidity of the curing environment) to form a thin silicone film and may be applied to the silicone rubber layer 34 of membrane 14 either by brushing, dipping, or, preferably, spraying on of the coating. Prior to coating, the silicone rubber layer 34 may be cleaned using an appropriate solvent (e.g., one which will not be absorbed by the silicone rubber layer), which should be allowed to completely evaporate before application of the coating. The coating is applied so as to completely (or nearly so) cover the silicone rubber layer 34 and is then allowed to cure, either at room temperature or by heating, so that the solvent in which the elastomer is dispersed is completely evaporated.

Alternatively, the coating 36 may be a physical coating such as a polytetrafluoroethylene (PTFE)-based dry lubricant, with particle sizes of a few microns, e.g., an emulsion of PTFE in a fluid propellant. Such lubricants are preferably sprayed on, although brushing or dipping applications may be used, to provide a uniform application to the silicone rubber layer 34. These lubricants are sprayed on and typically dry as a thin layer adhering to the surface of the silicone rubber layer (by Van der Waals forces) at room temperatures. Prior to application, the silicone rubber layer 34 is cleaned with an appropriate solvent to remove any dirt or other surface coating. Other coatings that reduce the surface energy of the silicone rubber layer 34 may also be used.

Prior to the application of coating 36, the silicone rubber layer 34 is bonded to the FEP film 32. Any appropriate bonding technique may be used, for example using a plasma etching treatment as described in EP2074188 A1 or using a chemical etching treatment. After etching, the liquid silicone rubber is applied to the surface of the FEP film 32 and allowed to cure. During its application, the thickness of the liquid silicone rubber is controlled, e.g., using a roller arrangement with a well-defined gap between the rollers, or using a blade maintained at a well-defined distance from the surface of the FEP film to remove excess liquid. Once the liquid silicone rubber is cured, coating 36 is applied to it. The service life of the coated multi-material membrane 14 has been found to be very long as compared to other membranes, even where the other membranes are similarly coated (e.g., on the order of 24 times longer than a coated silicone rubber membrane) but it is possible that the multi-material membrane will need to be reconditioned at some point in its service life. To do so, the multi-material membrane 14 is removed from the tank 10, cleaned, and a fresh coating 36 is applied (e.g., by spraying, dipping, or brushing). Depending on the area of the membrane being coated, a coating layer of between 0.2 grams-1.5 grams, and preferably 0.36 grams-0.5 grams, may be applied.

Figure 8:
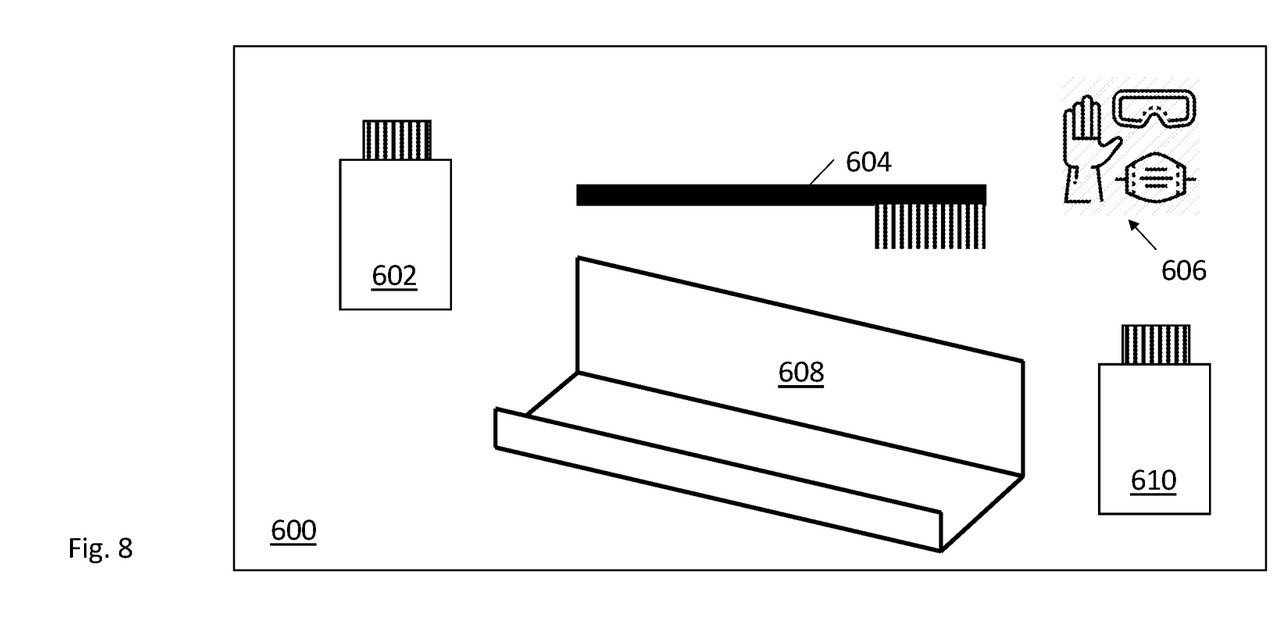
FIG. 8 illustrates a refurbishment kit according to an embodiment of the invention.

While the refurbishment may be offered as a service by vendors of the multi-material membrane 14 and/or 3D printing system 100, it may also be performed by users of the 3D printing system with the aid of a refurbishment kit. Such a kit 600, as illustrated in FIG. 8, may include a supply of coating material 602, an applicator (e.g., a spray bottle, brush or roller, or vat for dipping) 604, safety apparatus (such as gloves, goggles, and a mask) 606, and, optionally, a drying rack 608 for the membrane for use after the fresh coating is applied. Cleaning solvent 610 may also be included.

Figure 4:
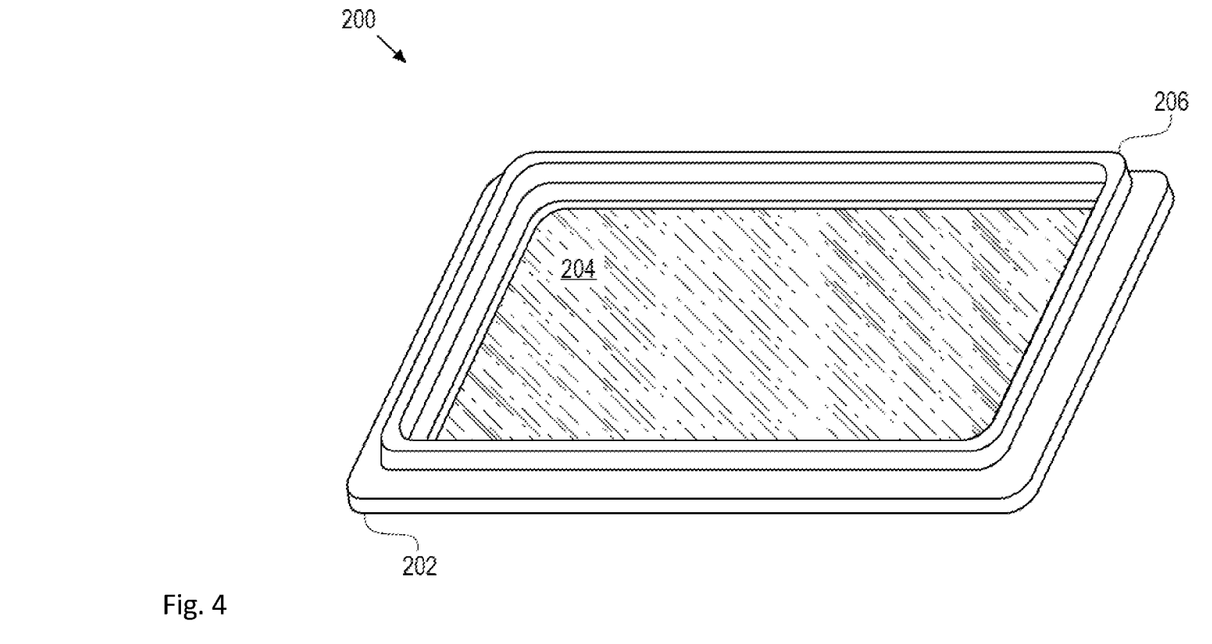
FIG. 4 depicts a perspective view of a membrane assembly for a 3D printing system.

As mentioned above, the multi-material membrane may be part of a replaceable cartridge assembly. FIG. 4 depicts a perspective view of a membrane assembly 200 for a 3D printing system in accordance with an embodiment of the present invention. Membrane assembly 200 may include radiation-transparent, flexible, multi-material membrane 204, the perimeter of which is secured to a frame 202. Frame 202 may be configured to stretch membrane 204 along a first plane. Frame 202 may comprise lip 206 that extends in a direction perpendicular to the first plane. Lip 206 may be secured to a bottom rim of a tank sidewall (as discussed below). Membrane assembly 200, when secured to the bottom rim of the tank sidewall, forms a bottom of a tank configured to contain a photo-curing liquid resin. In FIG. 4, frame 202 is depicted to have a rectangular shape, however, other shapes for frame 202 are possible, including square, oval, circular, etc.

Figure 5:
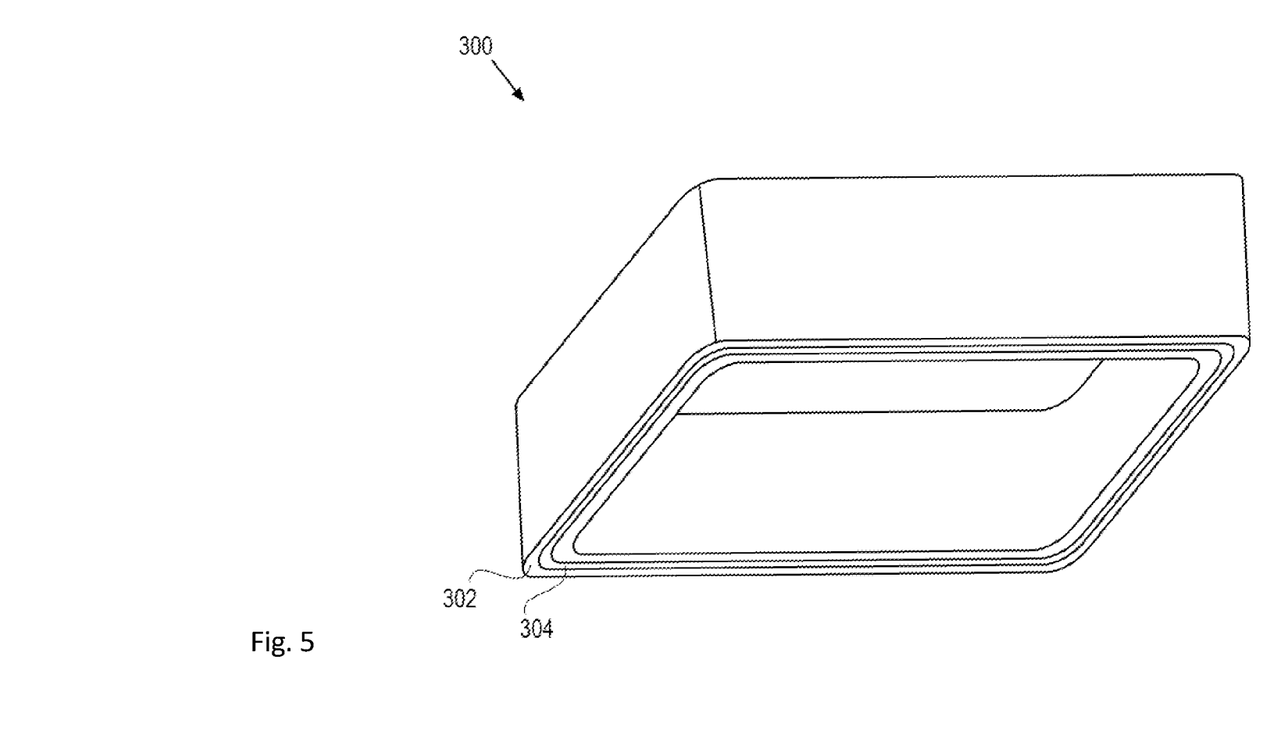
FIG. 5 depicts a perspective view of tank sidewall for a 3D printing system.

FIG. 5 depicts a perspective view of tank sidewall 300 for a 3D printing system. The tank sidewall 300 includes bottom rim 302 with groove 304. Lip 206 of frame 202 may be inserted within groove 304 so as to secure membrane assembly 200 onto the base of tank sidewall 300. The shape and dimensions of tank sidewall 300 must match the shape and dimensions of frame 202. For instance, if frame 202 were rectangular, a tank sidewall 300 must also be rectangular (i.e., when viewed from above).

Figure 6A:
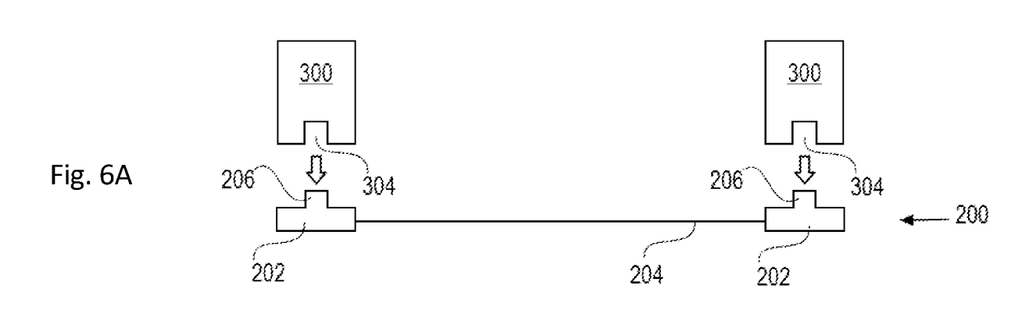
FIGS. 6A and 6B depict cross-sectional views of a membrane assembly and tank sidewall illustrating the membrane assembly secured to a bottom rim of the tank sidewall.
Figure 6B:
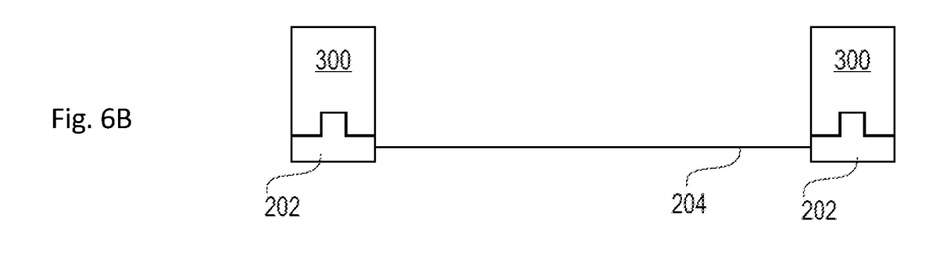

FIGS. 6A and 6B depict cross-sectional views of membrane assembly 200 (with frame 202 and membrane 204) and tank sidewall 300 and show how membrane assembly 200 is secured to bottom rim 302 of tank sidewall 300. FIG. 6A depicts lip 206 of frame 202 aligned under groove 304 of tank sidewall 300. FIG. 6B depicts lip 206 of frame 202 inserted within groove 304 of tank sidewall 300. Lip 206 and groove 304 may interlock with one another (e.g., in a snap-fit attachment), may snugly fit so that surfaces of lip 206 and groove 304 contact one another (e.g., in a friction-fit attachment), etc. In one embodiment, membrane assembly 200 may be a "consumable" product, in that it is disposed of or refurbished at the end of its useful lifetime. As such, membrane assembly 200 may play a similar role as printer cartridges in a printer; razor blades in a razor; etc.

Figure 7A:
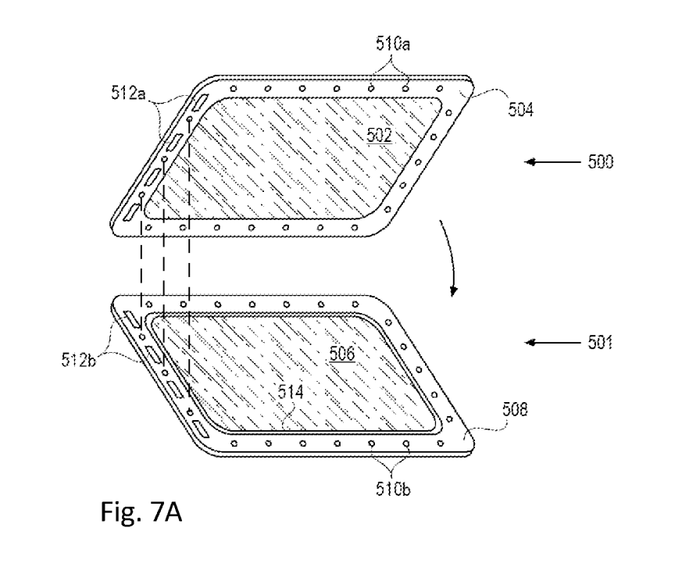
FIGS. 7A and 7B depict perspective views of a frame assembly and LCD assembly illustrating the frame assembly secured to the LCD assembly.
Figure 7B:
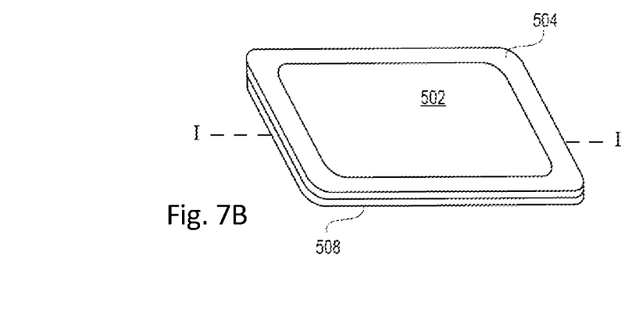

FIGS. 7A and 7B depict perspective views of a frame assembly 500 and LCD assembly 501, showing how frame assembly 500 may be secured to LCD assembly 501. Frame assembly 500 may include frame 504 and radiation-transparent, flexible, multi-material membrane 502, with frame 504 configured to hold membrane 502 at its perimeter. In other embodiments, the frame assembly 500 may support both membrane 502 and a transparent glass plate. Frame 504 may comprise through holes 510a and magnetized portions 512a distributed about a bottom surface of frame 504. LCD assembly 501 may include frame 508 and LCD 506, in which frame 508 is configured to hold LCD 506. Frame 506 may comprise through holes 510b and magnetized portions 512b distributed about a top surface of frame 508.

As depicted in FIG. 7A, a pattern in which through holes 510a are distributed about the bottom surface of frame 504 may be a mirror image of a pattern in which through holes 510b are distributed about the top surface of frame 508. As further depicted in FIG. 5A, a pattern in which magnetized portions 512a are distributed about the bottom surface of the frame 504 may be a mirror image of a pattern in which magnetized portions 512b are distributed about the top surface of frame 508. Each one of magnetized portions 512a may be attracted to a corresponding one of magnetized portions 512b such that when frame 504 is disposed in proximity to frame 508, the bottom surface of the frame 504 automatically contacts the top surface of frame 508, and each one of the through holes 510a automatically aligns with a corresponding one of through holes 510b. Gasket 514 may be disposed at or near a perimeter of LCD 506. The purpose of gasket 514 will be explained below with respect to FIG. 7C.

FIG. 7B depicts a perspective view of frame 504 affixed to LCD frame 508. Frame 504 surrounds radiation-transparent, flexible, multi-material membrane 502 and (optionally) a glass plate. LCD 506 is not visible in FIG. 5B but is located directly beneath membrane 502. Small screws or pins may be inserted through aligned pairs of through holes 510a and 510b to secure this arrangement. Openings for such screws or pins may be located in a bottom surface of frame 508 (not depicted).

Figure 7C:
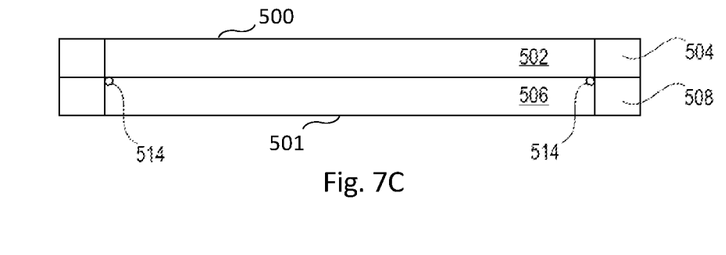
FIG. 7C depicts a cross-sectional view along line I-I of FIG. 7B.

FIG. 7C depicts a cross-sectional view along line I-I of FIG. 7B. As shown in FIG. 7C, frame assembly 500 is affixed to the LCD assembly 501. More particularly, a bottom surface of frame 504 contacts a top surface of frame 508, and membrane 502 is disposed above LCD 506. Gasket 514 is disposed within or near a boundary region between the bottom surface of frame 504 and the top surface of frame 508. In the event that resin (or another fluid) is able to penetrate the boundary region between the bottom surface of frame 504 and the top surface of frame 508, gasket 514 may prevent the resin from flowing between LCD 506 and membrane 502 (which may lead to undesirable distortion in images projected from LCD 506).

As described above, magnets (or magnetized portions of the frames) were used to automatically align through holes 510a with through holes 510b. In addition or alternatively, grooves (e.g., saw tooth grooves) disposed on both the bottom surface of frame 504 and the top surface of frame 508 (and particularly grooves in the bottom surface that are complementary to grooves in the top surface,) may also be used as a self-alignment mechanism.

Thus, examples of multi-material membranes for use in vat polymerization printers have been described.

What is claimed is:

1. A multi-material membrane for a three-dimensional printing system, the membrane comprising a fluorinated ethylene propylene (FEP) or polyolefin polymer film bonded to a layer of silicone rubber at a first side of the layer of silicone rubber, the layer of silicone rubber having a coating on a second side thereof, the coating configured to reduce surface energy of the layer of silicone rubber.

2. The multi-material membrane of claim 1, wherein the coating comprises a silicone elastomer.

3. The multi-material membrane of claim 1, wherein the coating comprises a polytetrafluoroethylene (PTFE)-based material.

4. The multi-material membrane of claim 1, wherein the coating is a cured layer of a silicone elastomer.

5. The multi-material membrane of claim 1, wherein the coating comprises a layer of polytetrafluoroethylene (PTFE).

6. The multi-material membrane of claim 1, wherein the FEP or polyolefin polymer film has a thickness of 0.03-0.1 mm.

7. The multi-material membrane of claim 6, wherein the layer of silicone rubber has a thickness of 0.03-0.1 mm.

8. A method of treating a multi-material membrane for a three-dimensional printing system, wherein the multi-material membrane consists of a fluorinated ethylene propylene (FEP) or polyolefin polymer film bonded to a layer of silicone rubber at a first side of the layer of silicone rubber, the method comprising applying a coating on a second side of the layer of silicone rubber, the coating configured to reduce surface energy of the layer of silicone rubber.

9. The method of claim 8, wherein the coating is applied by spraying on a silicone elastomer dispersed in medium and curing the coating until it forms a silicone film on the layer of silicone rubber.

10. The method of claim 9, wherein the curing is performed at room temperature.

11. The method of claim 9 wherein the curing is performed at a temperature above room temperature.

12. The method of claim 8, wherein the coating is applied by spraying on a polytetrafluoroethylene (PTFE)-based dry lubricant.

13. The method of claim 8, further comprising prior to applying the coating, cleaning the second side of the layer of silicone rubber with a solvent.

14. The method of claim 8, wherein the coating is applied by spraying, brushing, or dipping.

15. A membrane assembly for a three-dimensional printing system, comprising:
   the multi-material membrane of claim 1; and
   a frame affixed to a perimeter of the multi-material membrane and configured to stretch the multi-material membrane along a first plane.

16. The membrane assembly of claim 15, wherein the frame includes a first plurality of through holes and a second plurality of magnetized portions distributed about a surface of the frame.

17. A three-dimensional (3D) printing system, comprising a tank assembly, the multi-material membrane of claim 1, a lighting assembly, and a liquid crystal display (LCD) secured between the lighting assembly and the multi-material membrane.

18. The 3D printing system of claim 17, wherein the multi-material membrane is secured in a frame having a lip that engages with a groove of a sidewall of the tank assembly.

* * * * *